United States Patent [19]

Kato et al.

[11] Patent Number: 4,858,279
[45] Date of Patent: Aug. 22, 1989

[54] HOSE CLAMP

[75] Inventors: Yoshinori Kato; Mitsuaki Nakanishi; Yasushi Fujita; Nobuo Takagi, all of Aichi, Japan

[73] Assignee: Kabushiki Kaisha Togo Seisakusho, Aichi, Japan

[21] Appl. No.: 230,183

[22] Filed: Aug. 9, 1988

[30] Foreign Application Priority Data

Aug. 12, 1987 [JP] Japan .......................... 62-123582[U]

[51] Int. Cl.$^4$ ............................................. B65D 63/02
[52] U.S. Cl. ................................ 24/20 R; 24/20 EE; 24/20 S
[58] Field of Search ............. 24/20 R, 20 EE, 23 EE, 24/20 S, 20 CW

[56] References Cited

U.S. PATENT DOCUMENTS

| | | | |
|---|---|---|---|
| 1,379,476 | 5/1921 | Parr | 24/20 CW |
| 3,358,351 | 12/1967 | Ott | 24/23 EE |
| 4,380,096 | 4/1983 | Nishida et al. | 24/20 R |
| 4,425,681 | 1/1984 | Ilius | |
| 4,468,840 | 9/1984 | Sauer et al. | 24/20 R |
| 4,523,352 | 6/1985 | Wachter | 24/20 CW |
| 4,674,720 | 6/1987 | Fetsch | 24/20 EE |

FOREIGN PATENT DOCUMENTS 1560606  2/1980  United Kingdom ............... 24/20 R Primary Examiner—Victor N. Sakran
Attorney, Agent, or Firm—Paul L. Sjoquist

[57] ABSTRACT

A hose clamp made from a unitary, spring steel band formed into a generally cylindrical configuration. The clamp has a support piece extending radially outwardly from one end of the spring steel band, a slot opening formed in the one end adjacent the support piece and extending a predetermined length in a circumferential direction of the spring steel band, a projecting piece formed at the other end of the spring steel band and fitting in circumferential relationship in the slot opening, and an upstanding tab formed at the distal end of the projecting piece and extending radially outwardly of the spring steel band. With this arrangement, when the spring steel band is deflected to its expanded position, the tab is retained on the support piece so as to temporarily lock the spring steel band in its open or expanded position.

8 Claims, 6 Drawing Sheets

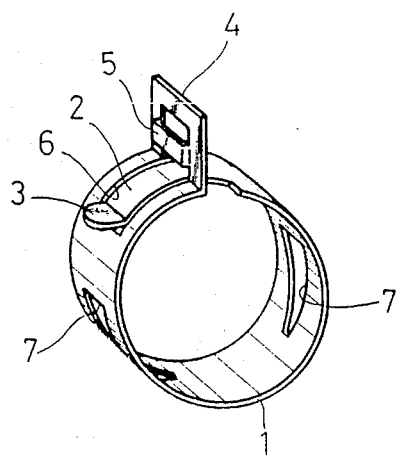
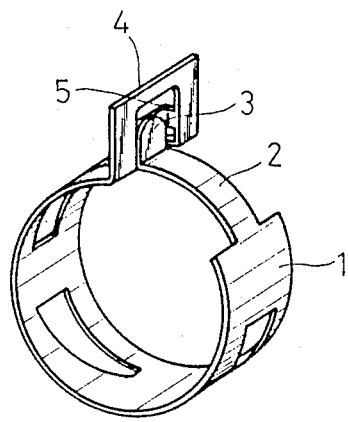
FIG.1　　　　　　FIG.2
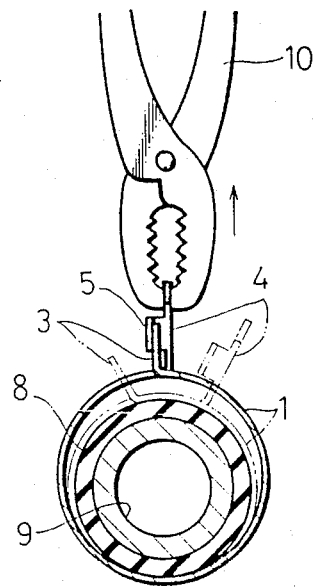
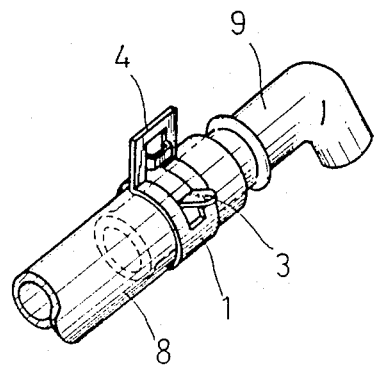
FIG.3　　　　　　FIG.4

HOSE CLAMP

BACKGROUND OF THE INVENTION

1. Field of the Invention

The present invention relates to hose clamps, and more particularly to spring-type hose clamps for fixedly connecting a rubber hose with a radiator pipe of an automobile in air tight or liquid tight manner.

2. Description of the Prior Art

Conventionally, such spring-type hose clamps are available in two types: non-trigger type 61 shown in FIGS. 17 and 18, and temporarily locked type 66 shown in FIGS. 19 and 20.

The non-trigger type clamp 61 of FIG. 17 comprises a spring steel band 62 formed into a substantially cylindrical configuration, with projecting pieces 63 and 64 projecting from the respective ends of the band 62 in an alternate relation to each other and extending circumferentially of the band 62. Each of the projecting pieces 63 and 64 has a distal end bent radially outwardly and covered with a synthetic resin material to provide a finger grip portion 65. When the finger grip portions 65 of the band 62 in its free or unstressed condition as shown in FIG. 17 are brought toward each other by fingers as shown in FIG. 18, the loop of the band 62 is enlarged in diameter, and in this open position, the clamp 61 is passed over a hose (not shown). Thereafter, when the finger grip portions 65 are released, the clamp 61 is permitted to clamp the hose by returning force of the deflection of the band 62.

The temporarily locked type clamp 66 of FIG. 19 is constructed similarly to the clamp 61 described above and comprises a spring steel band 67 provided with projecting pieces 68 and 69 having the respective distal ends bent radially outwardly to form engaging pieces 70. When the band 67 is in its open or expanded position, the opposite engaging pieces 70 are temporarily locked by a holder 71, as shown in FIG. 19. The clamp 66 in this position is passed over a hose (not shown), and thereafter, when the holder 71 is removed by a suitable tool, the clamp 66 assumes the position indicated in phantom lines in FIG. 20 by returning force of the deflection of the band 67 to clamp the hose.

The non-trigger type clamps 61 are to be opened by a user to whom the clamps have been delivered. Thus, hose clamps for automobiles in which the spring force of spring steel bands is extremely high are very cumbersome for the user to handle.

The temporarily locked type clamps 66 can be delivered in their open, temporarily-locked position to a user, who is required only to remove the holder 71 to put the clamp in operation, so that the above problem can be eliminated.

However, the holder 71 for temporary lock is a separate member from the spring steel band 67 and hence, it includes the following problems: increase of manufacturing and assembling steps; waste of material and increase in costs due to discard of the holder 71 after service; possible falling and straying of the removed holder 71 into the interior of the body of the automobile, which will cause abnormal noise during driving; springing off of the holder 71 on removal due to strong resilient force of the spring steel band 67, which may endanger the operator; and inconvenience of inability to restore the temporarily locked position of the clamp 66 to replace the hose later for example, if the removed holder 71 is not reserved.

SUMMARY OF THE INVENTION

It is an object of the present invention to provide a spring-type hose clamp having a temporarily locking member formed integrally with the spring steel band and adapted for temporarily locking the clamp in its open or expanded position.

According to the present invention, there is provided a hose clamp which comprises a spring steel band formed into a generally cylindrical configuration with the respective ends arranged in opposed relation, a support piece extending radially outwardly from one end of the spring steel band, a slot opening formed in the one end adjacent the support piece and extending a predetermined length in a circumferential direction of the spring steel band, a projecting piece formed at the other end of the spring steel band and fitting in circumferential relationship in the slot opening, and an upstanding tab formed at the distal end of the projecting piece and extending radially outwardly of the spring steel band. With this arrangement, when the spring steel band is deflected to its expanded position, the tab is retained on the support piece so as to temporarily lock the spring steel band in its open or expanded position.

The spring steel band is deflected into the open or expanded position by a sutiable tool to displace the tab of the projecting piece toward the support piece. Then, the contractive force of the spring steel band is used to retain the tab on the support piece so as to hold the clamp in the temporarily locked position.

In applying the clamp to a hose connected with a pipe, the clamp in the temporarily locked position is first passed over the hose, and then external force in a predetermined direction is exerted to either one or both of the tab and the support piece to cause relative displacement and consequently to release the engagement therebetween. Thus, the hose is clamped by the contractive force of the spring steel band returning to its unstressed position.

The present invention will become more fully apparent from the claims and description as it proceeds in connection with the accompany drawings.

BRIEF DESCRIPTION OF THE DRAWINGS

FIG. 1 is a perspective view of a hose clamp according to a first embodiment of the invention, with the clamp shown in its unstressed position;

FIG. 2 is a rear perspective view of the clamp of FIG. 1, with the clamp shown in its temporarily locked position;

FIG. 3 is a view illustrating how to release the clamp of FIG. 2 from the temporarily locked position;

FIG. 4 is a perspective view illustrating application of the clamp to a hose;

DETAILED DESCRIPTION OF PREFERRED EMBODIMENTS

Figure 5:
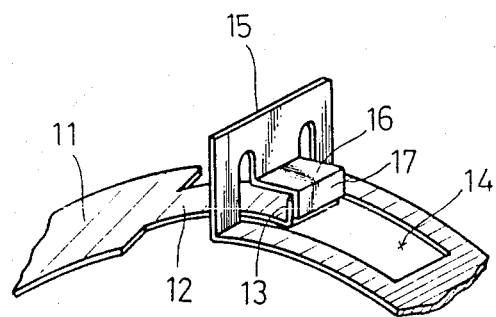
FIG. 5 is a fragmentary perspective view of a hose clamp according to a second embodiment of the invention, with the clamp shown in its temporarily locked position.

Referring now to FIGS. 1 to 4, shown therein is a hose clamp according to a first embodiment of the present invention. The hose clamp is formed from a unitary, spring steel band 1 having a predetermined spring force. The band 1 is formed into a generally cylindrical configuration with the respective ends arranged in opposed relation. The band 1 has a projecting piece 2 of a slightly reduced width extending circumferentially from one end thereof. The projecting piece 2 is provided with a radially outwardly directed tab 3 formed at the distal end thereof.

The band 1 also has a radially outwardly directed support piece 4 formed at the other end thereof. The support piece 4 is formed into a generally U-shaped configuration with a bridging abutment 5 disposed at a height corresponding to the tab 3. The support piece 4 has a cutout portion under the abutment 5 which is continued to a longitudinal slot opening 6 formed in the other end of the band 1 into which the projecting piece 2 can be inserted to form a portion of the periphery of the band 1. Further, the band 1 has a pair of openings 7 punched therein at suitable positions.

As shown in FIG. 1, when the hose clamp thus constructed is in its free or unstressed position, the projecting piece 2 passes through the cutout portion of the support piece 4 and extends behind the same into the slot opening 6.

When external force is exerted by a suitable tool to cause the projecting piece 2 to be deflectedly displaced in the direction of an arrow in FIG. 3 until the tab 3 comes in front of the support piece 4, the band 1 is deformed as a whole into its open or expanded position in which the diameter is enlarged by the amount corresponding to the distance of the displacement. In this position, when the tab 3 is brought into contact with the abutment 5 of the support piece 4, a contractive force of the band 1 returning to the unstressed position acts to retain the tab 3 on the abutment 5 so that the clamp can be temporarily locked in the open or expanded position, as shown in FIG. 2.

Now, the operation of the hose clamp thus constructed will be described.

The hose clamp which is preliminarily put in the temporarily locked position as shown in FIG. 2 is delivered to a user. The user passes the clamp in the temporarily locked position over a rubber hose 8, as shown in FIG. 3, and the rubber hose 8 is connected with a pipe 9 of a radiator or the like. Thereafter, the clamp is placed around the connection, and the support piece 4 is pulled radially outwardly by pliers 10 or the like. As the support piece 4 is deflectedly displaced in the pulling direction, the tab 3 is released from its engagement with the abutment 5, permitting the clamp to tighten the rubber hose 8 by the contractive force, as shown in phantom lines in FIG. 3 or as shown in FIG. 4.

As described above, the hose clamp which is temporarily locked in the expanded position is delivered to the user, and what is required for the user to use the clamp is only to release it from the temporarily locked position. Thus, the clamp may be easily handled. Furthermore, as the temporarily locked condition is achieved by cooperation of the projecting piece 2 and the support piece 4 which are both integrally formed with the spring steel band 1, the clamp may avoid waste of material and any possible troubles by falling off, loss or the like of a separate part which would be involved in the above mentioned prior art employing a separate holder for temporary lock. The temporary lock structure is repeatedly serviceable such as when the hose is replaced. When it is desired to replace or repair the hose, the user has to resiliently expand the clamp from its tightened position shown in FIG. 4. Since the tab 3 and the support piece 4 are designed to project radially outwardly, the expanding operation may be easily accomplished by applying a tool, for example pliers to the tab 3 and the support piece 4.

Figure 6:
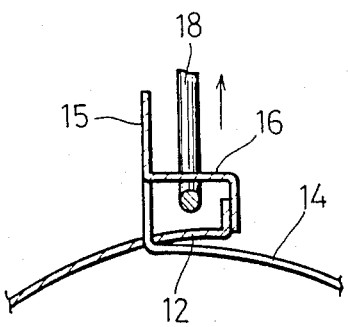
FIGS. 6 and 7 are views illustrating how to release the clamp of FIG. 5 from the temporarily locked position.
Figure 7:
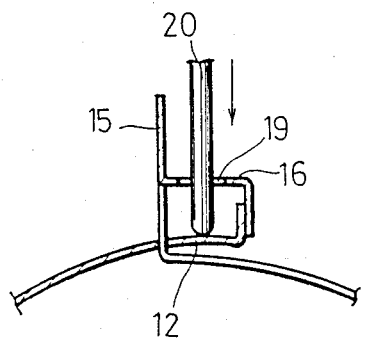

FIGS. 5 to 7 show a second embodiment of a hose clamp constructed in accordance with the present invention. The hose clamp of the second embodiment is made from a unitary, spring steel band 11 formed into a generally cylindrical configuration. The band 11 has a projecting piece 12 formed at one end thereof. The projecting piece 12 is provided with a radially outwardly directed tab 13 formed at the distal end thereof. The band 11 also has at the other end thereof a londitudinal slot opening 14 and a radially outwardly directed support piece 15. The support piece 15 is formed into a generally U-shaped configuration having a cutout portion joined to the slot opening 14. The support piece 15 is provided with an abutment portion 16 projecting from the upper central portion thereof. The abutment portion 16 has a radially inwardly directed locking portion 17 formed at the distal end thereof.

When the band 11 is in its open or expanded position, the tab 13 is retained on the locking portion 17 to hold the clamp in its temporarily locked position, as shown in FIG. 5.

In order to release the clamp of this embodiment from the temporarily locked position, a push rod 18 having a distal end bent in L-shaped configuration may be employed. As shown in FIG. 6, the bent portion of the rod 18 is inserted from sideways between the abutment portion 16 and the projecting piece 12 and then the rod 18 is drawn in the direction of an arrow. Alternatively, the abutment portion 16 may have a hole 19 as shown in FIG. 7. Then, the clamp may be released from the temporarily locked position by inserting a straight rod 20 through the hole 19 so as to push the projecting piece 12 in the direction of an arrow in FIG. 7. In other respects, the operation and effect of the second embodiment is similar to those of the first embodiment.

Figure 8:
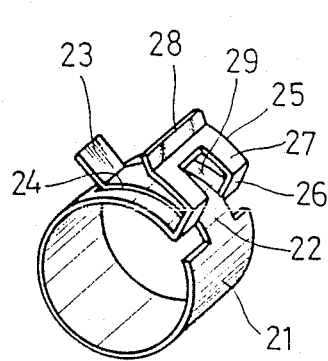
FIG. 8 is a perspective view of a hose clamp according to a third embodiment of the invention, with the clamp shown in its unstressed position.
Figure 9:
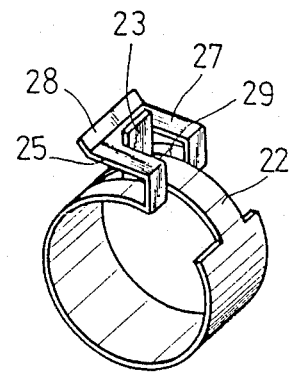
FIG. 9 is a perspective view similar to FIG. 8 and illustrates the clamp in its temporarily locked position.
Figure 10:
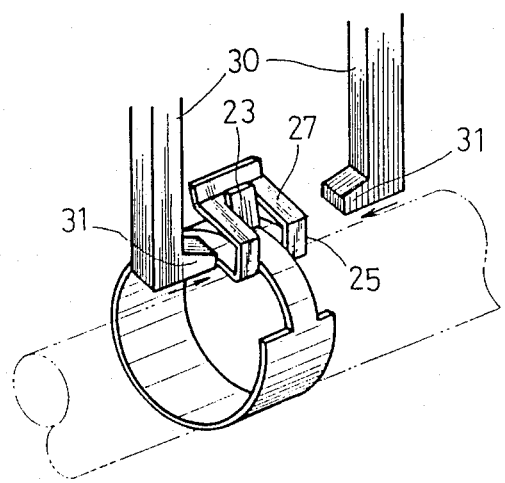
FIG. 10 is a perspective view illustrating how to release the clamp of FIG. 9 from the temporarily locked position.

FIGS. 8 to 10 show a third embodiment of a hose clamp constructed in accordance with the present invention. The hose clamp of the third embodiment is made from a unitary, spring steel band 21 formed into a generally cylindrical configuration. The band 21 has a projecting piece 22 formed at one end thereof. The projecting piece 22 is provided with a radially outwardly directed tab 23 formed at the distal end thereof. The band 21 also has at the other end thereof a slot opening 24 and a support piece 25. The support piece 25 is composed of a pair of leg portions 26 extending radially outwardly from the other end of the band 21, an abutment portion 27 extending circumferentially rearwardly from the upper ends of the leg portions 26, and a guide portion 28 angularly upwardly extending from the distal end of the abutment portion 27. A cutout portion 29 is formed in the abutment portion 27 and between the leg portions 26 and is joined to the slot opening 24.

When the clamp of this embodiment is in its unstressed position, the projecting piece 22 passes through the lower portion of the support piece 25 and is inserted in the slot opening 24, as shown in FIG. 8. When the clamp is in its temporarily locked position as shown in FIG. 9, the projecting piece 22 is inserted in the cutout portion 29 in the support piece 25, with the tab 23 in engagement with the abutment portion 27, so that the clamp is held in its open or expanded position. When the clamp in the unstressed position is to be displaced into the temporarily locked position, the tab 23 can be guided by the inclined guide portion 28 to pass through the lower portion of the support piece 25, permitting smooth displacement into the temporarily locked position.

In order to release the clamp of this embodiment from the temporarily locked position, a tool 30 having at distal ends thereof tapered insert portions 31, such as shown in FIG. 10, may be employed. The insert portions 31 are inserted from sideways under the abutment portion 27 to raise the support piece 25 radially outwardly and consequently to release the tab 23 from engagement with the abutment portion 27. In other respects, the operation and effect of the third embodiment is similar to those of the first embodiment.

Figures 11, 12, 13:
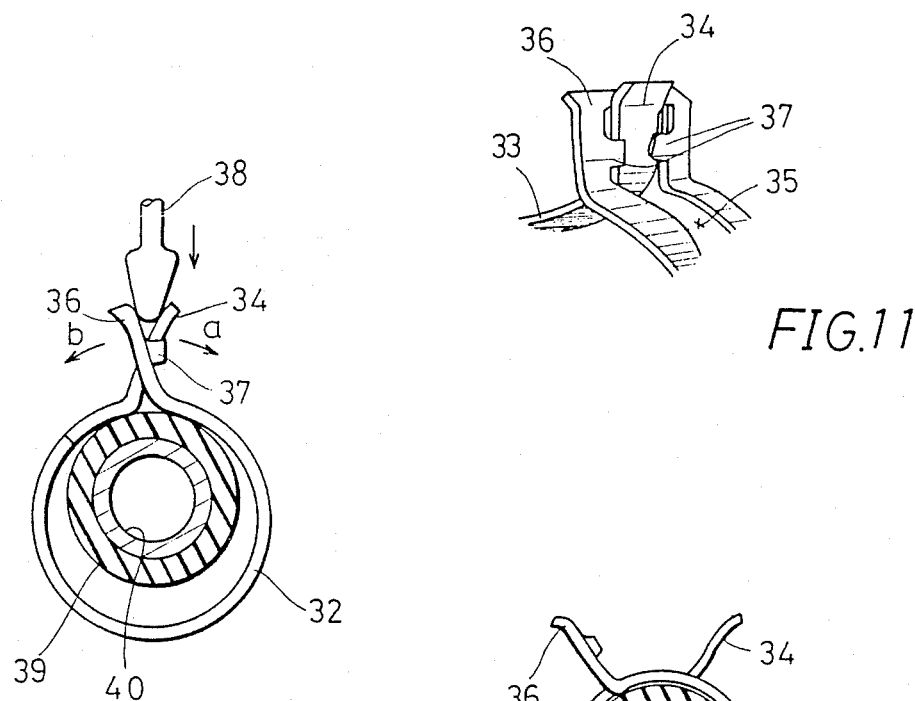
FIG. 11 is a fragmentary perspective view of a hose clamp according to a fourth embodiment of the invention, with the clamp shown in its temporarily locked position.
FIG 12 is a view illustrating how to release the clamp of FIG. 11 from the temporarily locked position.
FIG. 13 is a view illustrating the clamp of FIG. 12 clamping a rubber hose.

FIGS. 11 to 13 show a fourth embodiment of a hose clamp constructed in accordance with the present invention. The hose clamp of the fourth embodiment is made from a unitary, spring steel band 32 formed into a generally cylindrical configuration. The band 32 has a projecting piece 33 formed at one end thereof. The projecting piece 33 is provided with a radially outwardly directed tab 34 formed at the distal end thereof. The band 32 also has at the other end thereof a londitudinal slot opening 35 and a radially outwardly directed support piece 36. The support piece 36 is formed into a U-shaped configuration having a cutout portion joined to the slot opening 35. The support piece 36 is provided at a sutable height with a pair of locking portions 37 extending inwardly into the cutout portion. The distal end of the tab 34 and the distal end of the support piece 36 are bent in a somewhat inclined manner in a direction away from each other.

When the clamp of this embodiment, is in its temporarily locked position, as shown in FIG. 11, the base portion of the tab 34 is firmly engaged with the back sides of the locking portions 37, while the distal end thereof is held in a position extending through the cutout portion of the support piece 36 to the front side of the support piece 36.

In order to release the clamp of this embodiment from the temporarily locked position, as shown in FIG. 12, a tool 38 having a V-shaped end is inserted from upside into the V-shaped space between the respective distal ends of the tab 34 and the support piece 36 to urge the tab 34 and the support piece 36 in the opposite directions shown by arrows a and b, respectively, so that the locking portions 37 locking the tab 34 may be forced open. The clamp thus released from the temporarily locked position is permitted to clamp a rubber hose 39 connected with a pipe 40 by the contractive force of the band 32. In other respects, the operation and effect of the fourth embodiment is similar to those of the first embodiment.

Figure 14:
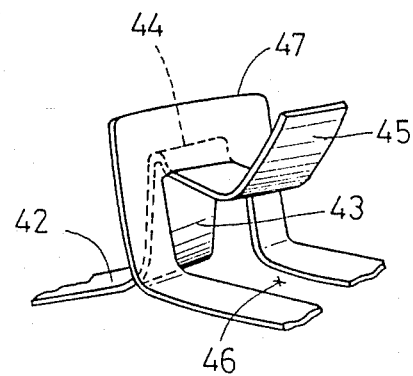
FIG. 14 is a fragmentary perspective view of a hose clamp according to a fifth embodiment of the invention, with the clamp shown in its temporarily locked position.
Figures 15, 16:
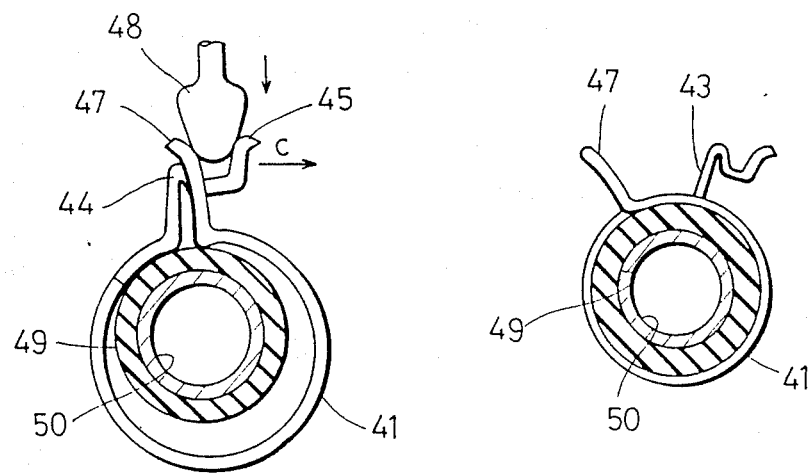
FIG. 15 is a view illustrating how to release the clamp of FIG. 14 from the temporarily locked position.
FIG. 16 is a view illustrating the clamp of FIG. 15 clamping a rubber hose.
Figure 17:
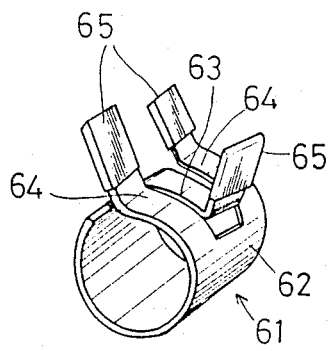
FIG. 17 is a perspective view of a prior art hose clamp.
Figure 18:
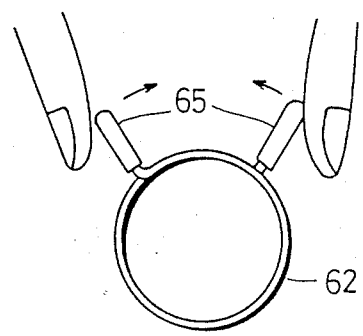
FIG. 18 is a view illustrating how to expand the clamp of FIG. 17.
Figure 19:
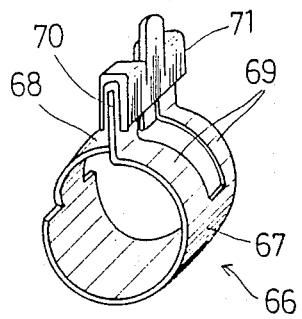
FIG. 19 is a perspective view of another prior art hose clamp.
Figure 20:
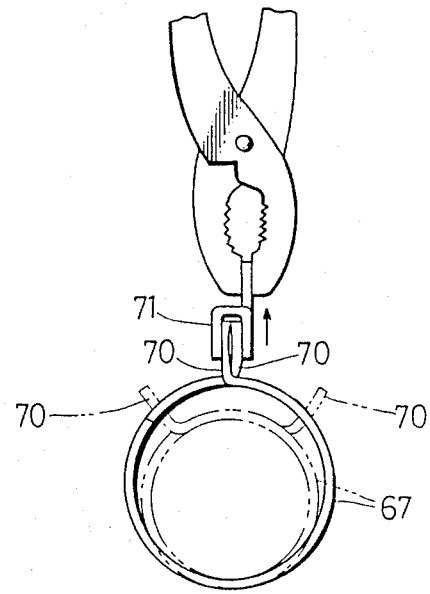
FIG. 20 is a view illustrating how to release the clamp of FIG. 19 from its temporarily locked position.

FIGS. 14 to 16 show a fifth embodiment of a hose clamp constructed in accordance with the present invention. The hose clamp of the fifth embodiment is made from a unitary, spring steel band 41 formed into a generally cylindrical configuration. The band 41 has a projecting piece 42 formed at one end thereof. The projecting piece 42 is provided with a radially outwardly directed tab 43 formed at the distal end thereof. As shown in FIG. 14, the tab 43 is folded downward at a portion thereof to form a radially inwardly directed locking portion 44 and is terminated by an L-shaped bearing portion 45 extending from the locking portion 44. The band 41 also has at the other end thereof a londitudinal slot opening 46 and a radially outwardly directed support piece 47. The support piece 47 is formed into a U-shaped configuration having a cutout portion joined to the slot opening 46.

As shown in FIG. 14, when the band 41 is in its open or expanded position, the clamp is temporarily locked, with the locking portion 44 in engagement with the back surface of the support piece 47 above the cutout portion and with the bearing portion 45 extending forwardly of the support piece 47.

In order to release the clamp of this embodiment from the temporarily locked position, as shown in FIG. 15, a V-shaped tool 48 is forced from upside between the bearing portion 45 and the support piece 47 so as to deflect the bearing portion 45 raidally inwardly as well as to push the same in the direction of an arrow c in FIG. 15 and consequently to release the locking portion 44 from engagement with the support piece 47. The clamp thus released from the temporarily locked position is permitted to clamp a rubber hose 49 connected with a pipe 50 by the contractive force of the band 41, as shown in FIG. 16. In other respects, the operation and effect of the fifth embodiment is similar to those of the first embodiment.

While the invention has been described with reference to preferred embodiments thereof, it is to be understood that modifications or variations may be easily made without departing from the scope of the invention which is defined by the appended claims.

What is claimed is:
1. A hose clamp comprising:
a spring steel band formed into a generally cylindrical configuration with the respective ends arranged in opposed relation;

a support piece extending radially outwardly from one end of said band and having an opening formed in the central lower portion thereof;

a bridging abutment projecting across said support piece opening;

a slot formed in said one end adjacent said support piece, said slot extending a predetermined length in a circumferential direction of said band and communicating with said support piece opening;

a projecting piece formed at the other end of said band and fittig in circumferential relationship in said slot opening; and an upstanding tab formed at the distal end of said projecting piece and extending radially outwardly of said band;

whereby when said band is deflected to its expanded position, said tab is retained against said bridging abutment so as to lock said band in its open or expanded position, and when said support piece is moved radially outwardly said tab is released from said bridging abutment.

2. The hose clamp as defined in claim 1, wherein said bridging abutment comprises a pair of legs extending from the opposite sides of said support piece opening, and a bridging piece extending between said pair of legs.

3. The hose clamp as defined in claim 1, wherein said bridging abutment extends from the upper central portion of said support piece.

4. The hose clamp as defined in claim 3, wherein said bridging abutment has an opening for passing a push rod therethrough.

5. The hose clamp as defined in claim 1, wherein said support piece has a pair of leg portions extending radially outwardly from said one end of said band on respective sides of said opening, with a lateral portion extending between the distal ends of said leg portions, and wherein said bridging abutment is fixedly connected to and between said leg portions.

6. The hose clamp as defined in claim 5, wherein said lateral portion has a guide portion extending obliquely from the distal end of said lateral portion.

7. A hose clamp comprising:

a spring steel band formed into a generally cylindrical configuration with the respective ends arranged in opposed relation;

a support piece extending radially outwardly from one end of said band, said support piece having an opening terminating at the central lower end thereof and a pair of leg portions extending radially outwardly from said one end, adjacent the opposite sides of said opening, and a bridging abutment extending between said leg portions and across said opening;

a slot formed in said one end adjacent said support piece, said slot extending a predetermined length in a circumferential direction of said band and communicating with said opening of said support piece;

a projecting piece formed at the other end of said band and fitting in circumferential relationship in said slot; and an upstanding tab formed at the distal end of said projecting piece and extending radially outwardly of said band;

whereby when said band is deflected to its expanded position, said tab is retained on said support piece bridging abutment so as to temporarily lock said band in its open or expanded position.

8. A hose clamp comprising:

a spring steel band formed into a generally cylindrical configuration with the respective ends arranged in opposed relation;

a support piece extending radially outwardly from one end of said band and having an opening formed in the central lower portion thereof;

a slot opening formed in said one end adjacent said support piece and extending a predetermined length in a circumferential direction of said band and communicating with said opening of said support piece;

a projecting piece formed at the other end of said band and fitting in circumferential relationship in said slot opening; and an upstanding tab formed at the distal end of said projecting piece and extending radially outwardly of said band, said tab having a locking portion formed by bending a section of said tab radially inwardly, and a substantially L-shaped bearing portion extending outwardly from said locking portion;

whereby when said band is deflected to its expanded position, said tab is retained on said support piece so as to temporarily lock said band in its open or expanded position.

* * * * *